United States Patent Office 3,228,878
Patented Jan. 11, 1966

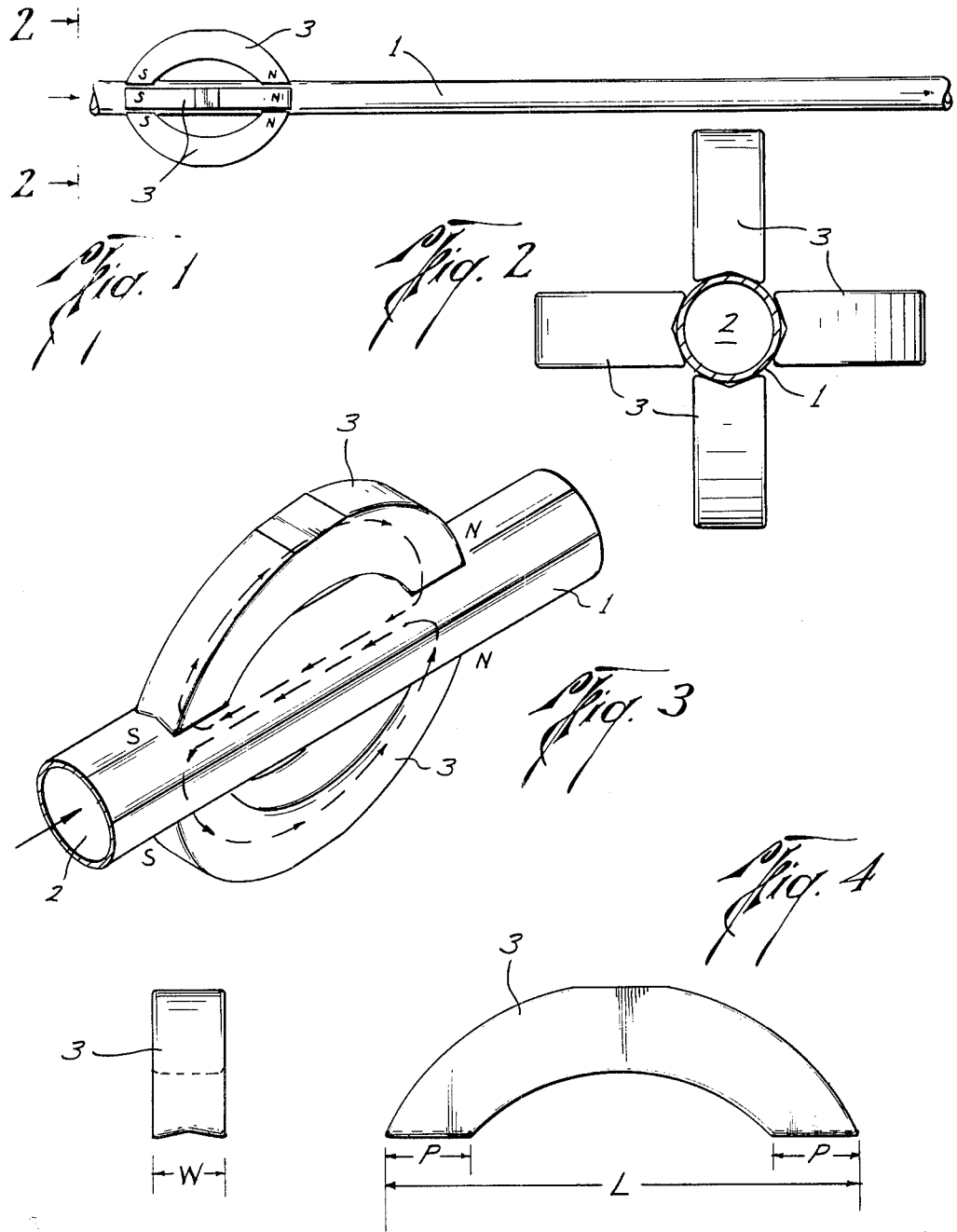

3,228,878
METHOD AND APPARATUS FOR TREATMENT OF FLOWING LIQUIDS TO CONTROL DEPOSITION OF SOLID MATTER THEREFROM
Dean L. Moody, Dallas, Tex., assignor, by mesne assignments, to Howard S. O'Neal, Oklahoma City, Okla.
Filed May 6, 1963, Ser. No. 278,246
3 Claims. (Cl. 210—57)

This invention relates to a method and device for the treatment of flowing liquid to bring about prevention and removal of diamagnetic deposits including scale and paraffin. This deposition control is achieved through an alteration of the energy content of the diamagnetic substances.

It is known that certain properties of diamagnetic substances are changed when placed in a magnetic field. It is the general opinion that these changes are only temporary and are lost when the field vanishes. This invention achieves an alteration of the diamagnetic substances that endure for an appreciable period after the substance has ceased to be exposed to the particular magnetic field.

Previous attempts by others to treat liquids with a magnetic field for the control of deposits therefrom have employed both electromagnets and permanent magnets but the former have not proven sufficiently stable and both have in most instances provided a more or less extended field produced by a series of magnets placed end to end along the path of flow. Most have placed the magnets within the path of flow as distinguished from outside such path. None has embodied the concept of concentrating the magnetic field to the greatest possible degree within a short portion of the flow passage of the liquid, to cause as great a change as possible therein, and then causing the fluid to flow a considerably greater distance with the least possible turbulence so as to permit the effect of the magnetic field to dissipate as slowly as possible.

The present applicaant has formerly employed permanent magnets outside the path of flow to treat liquids with a mgnetic field having but two polar zones (although on occasion employing more than two magnets) and permitting the liquid so treated to flow downstream from said magnetic field with a low turbulence. Some good results were so obtained but the change effected by the magnetic field was insufficient to be reliable or satisfactory in many cases. Furthermore, the importance of the rate of flow through the magnetic field was not appreciated nor was the importance of intensity and strength of the field understood.

It is an object of this invention to provide a method and apparatus which would make possible a much more effective control of the deposition and removal of deposits of diamagnetic substances from flowing liquids containing same than has been possible with the prior attempts above enumerated.

Another object is to provide a means for producing greater and more beneficial changes in such a liquid by a magnetic field than has been possible by previously known methods and apparatus, including but not limited to a reduction in surface tension of the liquid.

Other objects and advantages of this invention will become apparent from the following description taken in connection with the accompanying drawings wherein is set forth one embodiment of the invention which is by way of illustration and example and not by way of limitation.

In the drawings:
FIG. 1 is a side view of a section of a flow pipe providing a flow passageway for liquid, with magnets of the character contemplated by this invention mounted adjacent one end of the apparatus shown for the purpose of producing a magnetic field in liquid flowing therethrough, and the remainder of the length of pipe straight and of uniform diameter to provide for low turbulence flow of liquid after passing through the magnetic field;

FIG. 2 is a transverse sectional view taken along the line 2—2 of FIG. 1;

FIG. 3 is an enlarged perspective view indicating the magnetic field under the application of permanent magnets to a pipe as illustrated in the left-hand portion of FIG. 1 but on a much enlarged scale and showing the use of only two magnets instead of four;

FIG. 4 is a side elevation of a permanent magnet constructed in accordance with this invention; and FIG. 5 is an end elevation of the magnet illustrated in FIG. 4.

In the embodiment of the invention herein disclosed, a magnetic field is provided having but two polar zones placed a short distance from each other along a pipe and of a strength to provide substantial saturation of the flowing liquid within the field at any one instant. This field may be provided by one or more high strength permanent magnets located outside the flow passageway and each having its poles facing toward the passageway in a direction normal to its path of flow. Any number of such magnets of like character which the pipe periphery will accommodate may be employed on the same zone but in different radial dispositions about the passageway with all of the like poles adjacent each other, so that they will all add to the same field without obstructing the passageway and provide a field with only two polar zones along the passageway.

The magnets are of suitable material providing high flux density and great permanence such as are presently known and are shaped to give the greatest mass per unit of pole area and thereby provide the strong and the concentrated field required by many substances. A distance within the flow passageway from 10 to 150 times the length of the magnetic field is provided within which the magnetically treated liquid may flow with a minimum of turbulence and free from external magnetic influence to permit a gradual and avoid too rapid a dissipation of the change effected therein by the passage through the magnetic field.

While the rate of flow is not highly critical, a minimum rate is indicated for each substance, with about one-half foot per second being sufficient for most substances. Higher rates give improved results in most cases, with the limitation, however, that the central portion of the flowing stream should be fairly free of turbulence rates of flow high enough to produce turbulence throughout a large part of the stream have been found to produce deterioration of results. This, of course, varies with the size and condition of the pipe and the nature of the liquid and must be determined for each liquid and pipe.

It has been found also that the presence of an external magnetic influence, such as an electric motor, adjacent the flow downstream of the magnetic field of this invention, produces inferior results or destroys the benefit of this invention completely.

Referring now more in detail to the drawing, there is illustrated in FIGS. 1 and 2 a pipe 1, the interior of which provides a flow passageway 2 for the liquid to be treated. The illustrated section of the pipe 1 is straight and of uniform diameter and while some variation from an absolutely straight pipe and some variation from an absolutely uniform diameter can be tolerated, the same should be so gradual and of such small degree that it will not introduce substantial turbulence into the flow of liquid through the pipe.

For the purpose of producing a magnetic field in the flow passageway 2 in accordance with this invention, there are affixed to the exterior of the pipe 1 at a suitable location one or more permanent magnets 3. If there are more than one of such magnets they are all preferably, though not absolutely necessarily, identical in both shape, dimensions and charge. They are affixed to the pipe so that each magnet covers the same portion of the length of the pipe that the others do. By this means, whether one magnet or a number of magnets be employed, they will produce within the pipe a single magnetic field having only two poles or polar zones so that a single particle of material flowing through the pipe will pass one north pole and one south pole only, all of the north poles of all of the magnets being located adjacent one another and all of the south poles likewise being located adjacent one another.

The arrangement just described serves the double purpose of providing a highly localized concentrated strong magnetic field and thereby helps to make possible the magnetic saturation of the liquid moving through such field at any particular time. The liquid is thus given the most highly concentrated treatment by a magnetic field that is possible.

Thus, the liquid being treated in accordance with this invention is first subjected to such a strong magnetic field that while it is passing therethrough it is saturated, and it is thereafter caused to flow from such field for a considerable distance without being subjected to any highly turbulent conditions of flow such as would disturb and tend to rapidly dissipate the effects on the liquid of having passed through the magnetic field. During said non-turbulent flow the liquid should also be free of external magnetic influence. The distance that such flow with minimum of turbulence and freedom from external magnetic influence is caused to take place is not highly critical but in order to obtain reasonably good results, it should extend for a distance of from 10 to perhaps to 150 times the dimension of the magnetic field along the path of flow. It has been found that good results can be obtained in many cases with as short a distance of non-turbulent flow as 10 times the length of the magnetic field, but that in many cases it has been found that the maximum beneficial results are obtained by causing a continuance of such flow to the extent of between 100 and 150 times the length of the magnetic field.

In the event that the pipe 1 is of a ferrous material or some other material that will be attracted by a magnet, the magnets 3 may be secured to the pipe by their magnetic attraction only. However, in the event that the pipe is of some other material such as will not be attracted by a magnet, the magnets 3 may be secured to the pipe in any other suitable fashion.

On reference to FIGS. 3, 4 and 5, greater detail of the permanent magnets and their coaction with the pipe are illustrated.

On reference to FIG. 4 it will be seen that when viewed from the side the magnet is made much thicker adjacent its center than adjacent its two ends. This is accomplished in the magnet illustrated by making the inside curve and the outside curve both circular arcs with the outside curve on a considerably longer radius than the inside curve and with each curve somewhat less than a semicircle. The side walls may be straight and plane as indicated in FIG. 5. The pole faces, instead of being perfectly flat, are made of V-shape with the two outside edges projecting further from the body of the magnet than the central portion as illustrated in FIG. 5. By virtue of this shape, the magnet pole faces may fit closely against the curvature of a pipe and have their surfaces disposed more nearly normal to the closest portion of the liquid being treated and better able to direct the magnetic flow lines into the flow passageway than if they were flat and each in a single plane surface. It has been found also that if all sharp corners be eliminated by making them with a slight curvature, the efficiency of the magnet in producing a strong field within the flowing liquid is much enhanced. This is especially true of the corners along the boundaries of the pole faces.

While of course this invention is not limited to any one particular magnetic material for the making of the permanent magnets, it has been found that sintered alloys of aluminum, nickel, cobalt and iron, commonly known as Alnico, are quite suitable for this purpose, one known as Alnico V having been found especially suitable. The published magnetic properties of this one material are as follows:

Peak magnetizing force (oersteds) _____ 3,000
Peak induction (gausses) _____ 17,100
Remanence BR-(gausses) _____ 13,100
Coercive force Hc-(oersteds) _____ 640
Energy product (BdHd) _____ $6 \times 10^6$
Bd (gausses) _____ 10,750
Hd (oersteds) _____ 560

Using the material just described, a suitable magnet for pipes up to and including 2″ in diameter can be made with the inside radius $R_1$ 2⅜″, the outside radius $R_2$ 3¹⁄₁₆″ radius, each of the pole faces 1⁷⁄₃₂″ in length P and 2⁷⁄₃₂″ in width W, and the overall length L of the magnet 5¹⁵⁄₁₆″. The pole face surfaces should be cleared of all bumps and protrusions left in the casting operation by grinding them off or some other suitable manner.

For pipe diameters in excess of 2″, a suitable magnet may be provided by making the inside radius $R_1$ 3¹⁹⁄₃₂″, the outside radius $R_2$ 4⁵⁄₁₆″ radius, the length P of each pole face 1½″ and the width W of each pole face 1⁷⁄₃₂″.

Magnets such as just described may be highly charged and for the purposes of this invention should have each a charge of over 7,000 gausses and preferably as great as 10,000 gausses and highly stabilized.

The exact changes effected by the magnetic field provided by this invention and by the subsequent distance of non-turbulent flow provided in accordance with this invention is not known. However, it is known that if the element or compound in the liquid to be treated has a susceptibility of —.25 or more negative than —.25 this invention will be capable of treating such a liquid. It should be borne in mind that the susceptibility of the total molecule of a compound is the determining factor, not that of one of its elements. For example, although magnesium has a susceptibility of +0.55, magnesium chloride has a susceptibility of —0.58 and can be handled by this invention.

In accordance with this invention, the magnetic field is of such strength that the pipe, the fluid, and all the particles in the fluid are saturated by the field produced by the installation. It is believed that the compounds whose deposition may be controlled by this invention, being dipolar substances, are polarized upon passing through the magnetic field. There is evidence that precession of the dipoles of such substances occurs and that the dipoles thus have an induced magnetic moment with a field at right angles to the inducing field. With the substances saturated by the field, this precession is thought to be so complete that each molecule acts as a small magnet having a north and south pole and that they arrange themselves north to south and south to north with an alignment the same as the fluid flow. The individual field of the dipoles may then mass together and form a mass liquid magnet with a pole strength sufficient to cause magnetic leakage to occur. When this happens, there would be a breakdown of the fluid magnet and the homogenous condition of the field would begin to deteriorate. In some fashion it is thought that this deterioration, which apparently occurs gradually, generates a condition in the substances changing their character to such an extent that deposition will be lessened or stopped and perhaps previous deposits removed.

In any event, it has been found that by employing the apparatus as hereinbefore described with sufficient strength in the magnetic field to cause complete saturation, and then causing a flow devoid of excess turbulence and free of external magnetic influence to take place for a distance of the order hereinbefore indicated, the deposition of substances within the range of susceptibility above indicated can be lessened and in most instances can be stopped altogether by this invention. It is also possible in many cases to cause depositions which have been made from similar liquid to be removed by treatment of liquid flowing through an apparatus of the character described and being subjected to the treatment set forth.

From the foregoing it will be apparent that an apparatus and method have been disclosed which are fully capable of carrying out and accomplishing all of the objects and advantages taught by this invention.

From the foregoing it will be seen that this invention is one well adapted to attain all of the ends and objects hereinabove set forth, together with other advantages which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An apparatus for the treatment of a flowing liquid to control the deposition of solid diamagnetic materials therefrom which comprises a conduit having a flow passage therethrough for conducting said liquid, permanent magnet means located adjacent the exterior of said conduit providing a concentrated magnetic field of a strength to saturate said liquid in said conduit within said magnetic field, and a length of said conduit at least ten times the length of said magnetic field immediately downstream from said magnetic field being substantially straight and free of turbulence producing obstruction.

2. An apparatus as set forth in claim 1 in which said magnetic field is comprised of two polar zones only of opposite polarity and closely longitudinally spaced along the conduit relative to one another.

3. A method of treating liquid containing diamagnetic substances which comprises causing it to flow through a closed passageway, subjecting the body of flowing liquid throughout a zone of said passageway to a stable magnetic field having two polar zones and of a strength to saturate the body of liquid within said field, and conducting said flowing liquid leaving said field without substantial turbulence of flow or external magnetic influence a distance of at least ten times the distance of its flow through said magnetic field, and maintaining the rate of said flow at not less than one-half foot per second.

References Cited by the Examiner

UNITED STATES PATENTS

| | | | |
|---|---|---|---|
| 531,183 | 12/1894 | Harris | 210—42 |
| 1,401,130 | 12/1921 | Billon et al. | 317—201 |
| 2,380,560 | 7/1945 | Urquhart | 317—201 |
| 2,607,492 | 8/1952 | Anders | 210—222 |
| 2,782,369 | 2/1957 | Werner et al. | 73—53 X |
| 3,197,402 | 7/1965 | Ruskin | 210—42 |

MORRIS O. WOLK, *Primary Examiner.*

MICHAEL E. ROGERS, *Assistant Examiner.*